United States Patent [19]

Dupen

[11] 3,926,722
[45] Dec. 16, 1975

[54] REACTOR VESSEL HEAD SUPPORT ARRANGEMENT

[75] Inventor: Clive Frederick George Dupen, Weatogue, Conn.

[73] Assignee: Combustion Engineering, Inc., Windsor, Conn.

[22] Filed: June 29, 1973

[21] Appl. No.: 374,856

[52] U.S. Cl. .................... 176/87; 220/46; 248/146
[51] Int. Cl. ............................................. G21c 13/04
[58] Field of Search .......... 176/87; 220/5 A, 10, 46; 248/146

[56] References Cited
UNITED STATES PATENTS

| | | | |
|---|---|---|---|
| 2,890,009 | 6/1959 | Chepellier | 248/146 |
| 3,055,538 | 9/1962 | Schoessow | 220/46 |
| 3,123,328 | 3/1964 | Trickett et al. | 176/87 |
| 3,173,846 | 3/1965 | Chauvin et al. | 176/87 |
| 3,744,660 | 7/1973 | Gaines et al. | 176/87 |

*Primary Examiner*—Benjamin A. Borchelt
*Assistant Examiner*—C. T. Jordan
*Attorney, Agent, or Firm*—Stephen L. Borst

[57] ABSTRACT

A support and sealing arrangement for the vessel head of a nuclear reactor. The arrangement comprises a first support ring supported in the vessel cavity in which the reactor vessel is disposed, a plurality of flexible struts spaced about the circumference of the reactor vessel each of which has one end connected to the first support ring, and a second support ring which is supported by the other ends of the flexible struts to support the vessel head. The first and second support rings are each concentrically arranged with respect to the reactor vessel. Also, sealing means are provided for preventing fluid communication between the interior of the reactor vessel and the vessel cavity, and between the vessel cavity and the outside atmosphere.

8 Claims, 4 Drawing Figures

REACTOR VESSEL HEAD SUPPORT ARRANGEMENT

BACKGROUND OF THE INVENTION

This invention relates to nuclear reactors and more particularly to a support arrangement for the reactor vessel head. The head support arrangement is particularly adaptable for use with liquid metal, fast spectrum reactors in which the reactor is subject to severe temperature ranges.

Nuclear reactors are comprised of a reactor vessel which houses a nuclear core for generating substantial amounts of heat and which is disposed in a vessel cavity defined by a containment structure. Generally a plurality of control elements are provided for insertion into the array of fuel assemblies forming the core for controlling and regulating the nuclear chain reaction. Typically, these control elements are driven from outside of the reactor vessel and pass through the reactor vessel head. As can be appreciated, it is necessary to maintain the proper alignment of the control elements relative to the nuclear core in order to insure safe and effective operation of the nuclear reactor. In the situation where the control elements pass through and are supported by the reactor vessel head, this requirement has meant that the reactor vessel and the vessel head must be maintained in alignment during operation of the reactor. Otherwise relative offset or rotation movement, such as might result from radial differential thermal expansion between the relatively hot reactor vessel and the relatively cool vessel head, may cause jamming of the control elements.

Another problem of supporting the vessel head on the reactor vessel which is particularly significant for liquid metal fast spectrum reactors is sealing. Because of the volatile reaction between oxygen and liquid sodium (a typical coolant for liquid metal reactors), it has been desirable to support the reactor vessel in a containment structure which is sealed from the outside atmosphere. The containment atmosphere surrounding the reactor vessel is inserted so that if any liquid sodium leaks from the vessel, it would not react with any oxygen. Also, it may be desirable to seal the reactor vessel to prevent any leakage of radioactive contaminated soium into the containment structure. In some reactors the vessel head is used for this purpose to seal the containment structure from the outside atmosphere and to seal the reactor vessel from the vessel cavity. That is, the vessel head is properly positioned over the reactor vessel to prevent any fluid communication between the reactor vessel and the vessel cavity and between the vessel cavity and the outside atmosphere.

In one proposed reactor arrangement, the vessel head is rested on a support ring in the vessel cavity to overlie the reactor vessel. The reactor vessel is supported in the vessel cavity by a plurality of flexible arms which are each connected at one end to support ring concentrically disposed with respect to and spaced from the reactor vessel and at the other end to the reactor vessel. For sealing of the reactor vessel from the vessel cavity, gasket type seals are provided between the mating surfaces of the vessel head and the support ring. This support arrangement permits free radial thermally induced expansion of the vessel but not of the vessel head. Because the reactor vessel, the vessel head and vessel cavity are all at different temperatures during operation of the reactor, the components will all experience different thermally induced expansions. Differences in radial expansion between the vessel head, the reactor vessel and the support ring will cause the vessel head to slide relative to the support ring and thereby move relative to the free movement of the vessel. This result in a tendency toward misalignment between the vessel head and the reactor vessel. Furthermore, the gasket type seal is not a static seal (i.e., it is sliding) and accordingly is not as effective in preventing leakage between the reactor vessel and the vessel cavity.

SUMMARY OF THE INVENTION

Accordingly, there is provided a novel support arrangment for supporting the vessel head of the reactor which overcomes the above discussed and other advantages of the prior art. The present invention comprises a first support ring supported in the vessel cavity in which the reactor is disposed, a plurality of flexible struts each of which has one end connected to the first support ring, and a second support ring connected to and supported by the other ends of the flexible struts. The first and second support rings are concentrically disposed with respect to the reactor vessel, and the second support ring supports the vessel head in alignment with the reactor vessel. Sealing means may be provided for preventing fluid communication between the interior of the reactor vessel and the vessel cavity and between the vessel cavity and the atmosphere external to the cavity.

Such an arrangement will permit free radial differential thermal expansion of the reactor vessel and the vessel head while maintaining the alignment of the vessel head with respect to the reactor vessel. Also the arrangement is easily adaptable to provide for a static seal between the reactor vessel and the vessel cavity rather than a sliding seal. This is possible since the vessel head is supported by a flexible supported ring rather than by a fixed ring.

DESCRIPTION OF THE PREFERRED EMBODIMENT

Figure 1:
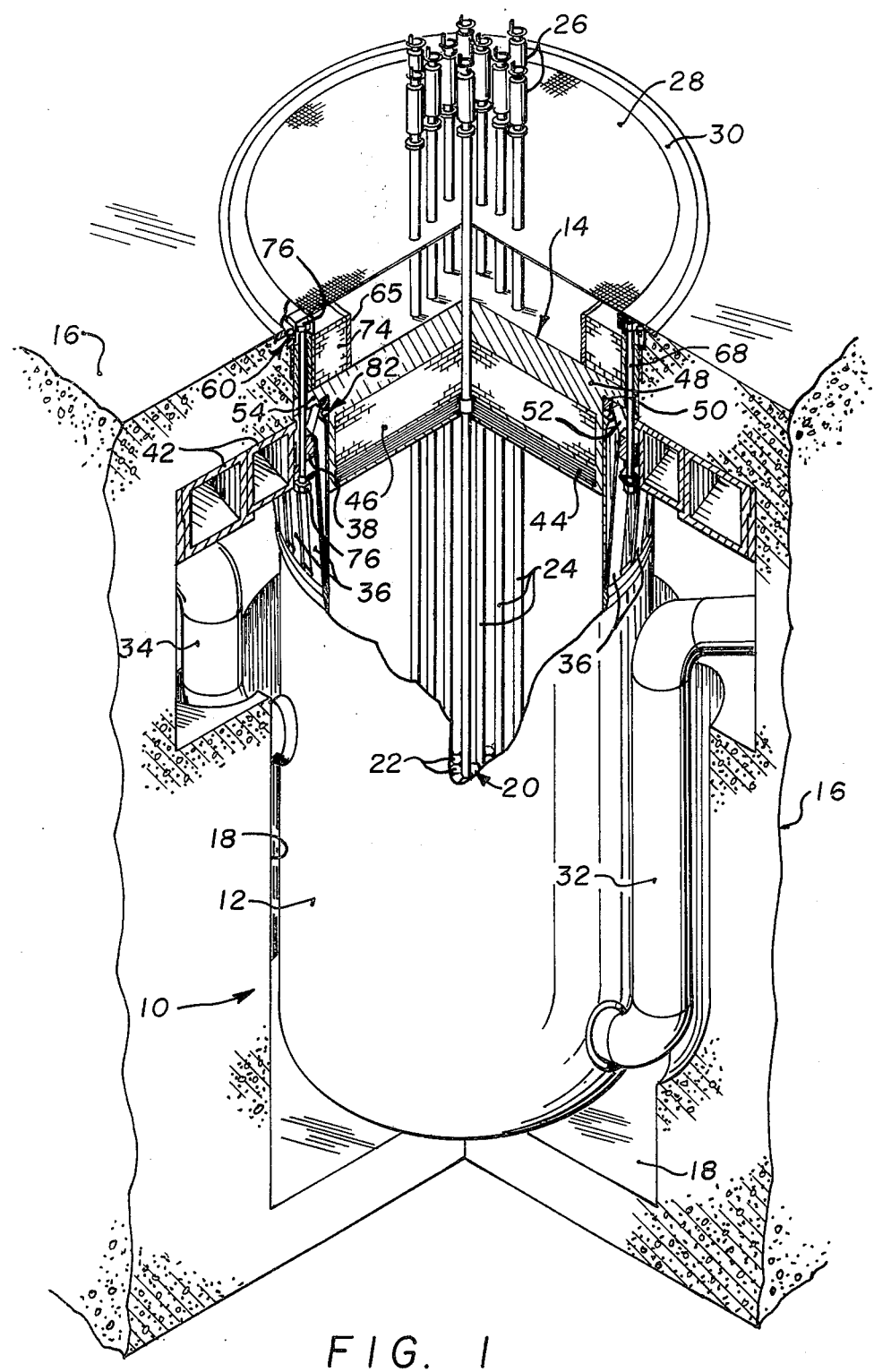
FIG. 1 is a perspective of a reactor incorporating the present invention with a portion thereof being cut away to illustrate the internals.

Referring now to the drawings, FIG. 1 shows generally a liquid metal fast spectrum reactor 10 having a reactor vessel 12 and a vessel head 14 vertically disposed and supported within the vessel cavity 18 of the concrete containment structure 16, the reactor vessel head 14 being supported in sealing relationship with respect to the reactor vessel 12 and containment structure 16 in accordance with the present invention. The reactor vessel 12 houses a nuclear core 20 comprised of a plurality of fuel assemblies 22. The fuel assemblies 22 are arranged and supported in a fixed array by a support structure (not shown) as is well known in the art. A plurality of control elements 24 and drive extensions thereof are supported by the vessel head 14 and are adapted for longitudinal movement into and out of the array of fuel assemblies 22 for controlling and regulating the nuclear chain reaction in the nuclear core 20. Drive means 26 are provided above the reactor vessel head 14 and head floor plate 28 for controlling the longitudinal movement of the control elements 24. The head floor plate 28 is supported by a steel ring 30 to provide a continuously extending operating floor at the upper surface of the containment structure 16. By way of the nuclear chain reaction, substantial amounts of heat are generated within the core 20, this heat being conveyed to a primary coolant, such as for example, liquid sodium, which is introduced into and removed from the nuclear core 20 via coolant inlet and outlet conduits 32 and 34. As is apparent, any relative offset and/or rotational movement between the reactor vessel 12 and the reactor vessel head 14 may result in the control elements and drive extensions thereof 24 being jammed.

Figure 2:
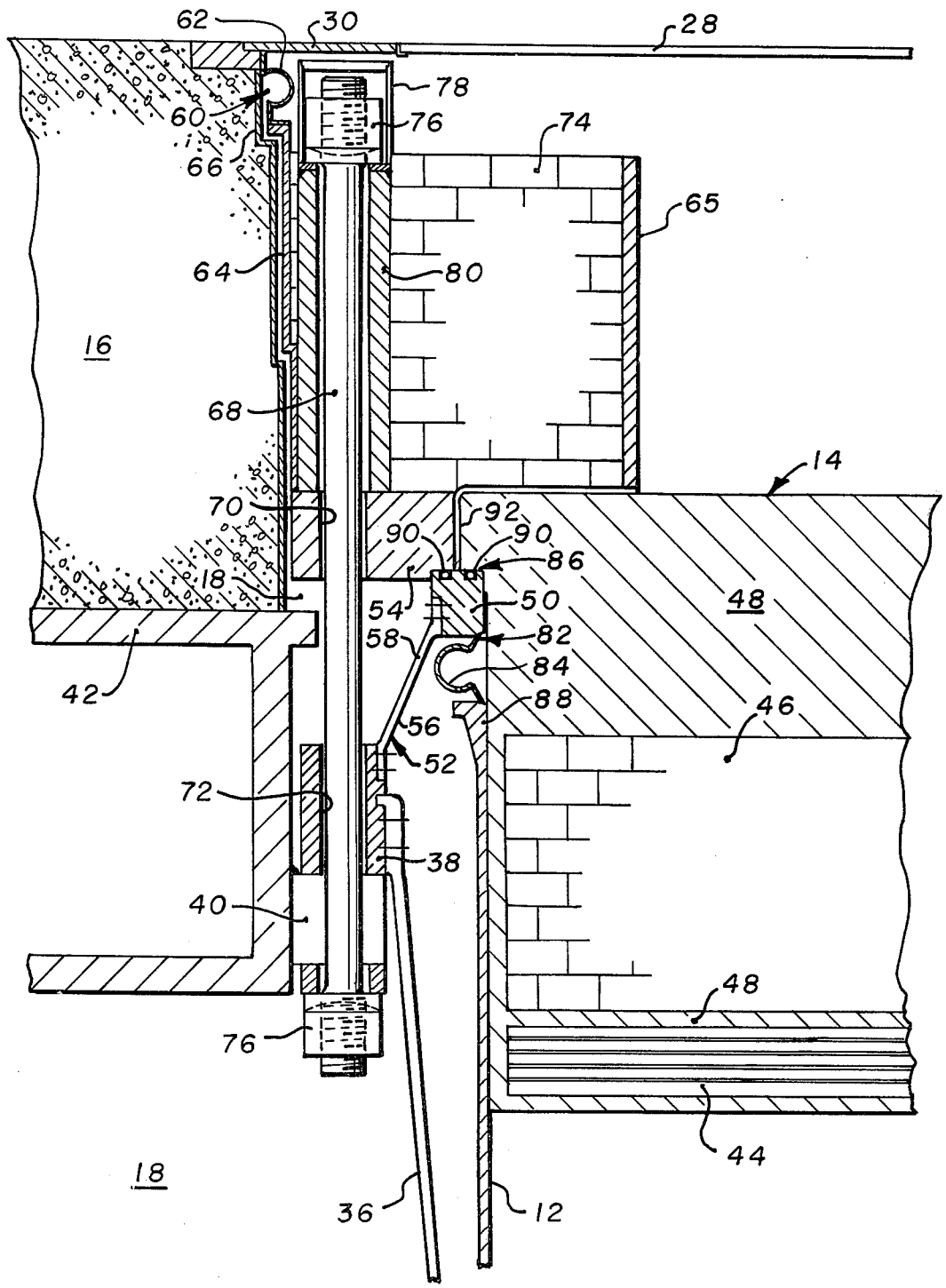
FIG. 2 is a side elevation view in section illustrating the vessel head support arrangement of the present invention with the projections of various components in the background being deleted for clarity.

Referring to FIGS. 1 and 2, the reactor vessel 12 is supported and aligned within the vessel cavity 18 by a plurality of vessel support flexible arms 36 which are spaced about and integrally attached to the circumference of the reactor vessel 12. The other ends of the flexible arms 36 are bolted or otherwise connected to a support ring 38 which is concentrically spaced from the reactor vessel 12 and which is supported in the vessel cavity 18 by a plurality of lugs 40 integrally attached to a ring girder 42. The ring girder 42 is supported by the containment structure 16 so as to be able to support the entire dead weight of the liquid metal reactor 10.

The reactor vessel head 14, together with the reactor vessel 12, provides the main containment boundary for the primary coolant of the reactor 10 and the cover gas if such is provided. The cover gas is necessary with liquid sodium reactors to insure that no oxygen is in the vessel which might otherwise react with the liquid sodium. The vessel head 14 also serves to hermetically seal the reactor vessel 12 and provide biological shielding, thermal insulation and alignment between the nuclear core 20 and interfacing systems such as the control elements 24. As seen in FIGS. 1 and 2, the vessel head 14 is comprised of a series of reflector insulating plates 44 and a series of graphite shielding blocks 46 housed within a welded steel enclosure structure 48. The reflector insulating plates 44 act to insulate the remainder of the head 14 from the high temperature of the liquid sodium coolant. The graphite blocks 46 and the steel enclosure structure 48 act as biological shielding from radiation caused by leakage of the contaminated cover gas and released fission products. The control element drive extensions 24 which pass through the vessel head 14 are also sealed to prevent any radiation leakage up through the control element penetrations in the head 14, as is well known in the art. Although not shown, the head 14 may also be provided with an access system for replacing and removing fuel assemblies 22 without having to remove the vessel head 14 from the reactor vessel 12. Furthermore, other changes or modifications in the reactor vessel head design may be made without departing from the practice of the present invention as described hereinbelow since the specific design forms no part of the invention.

Figure 3:
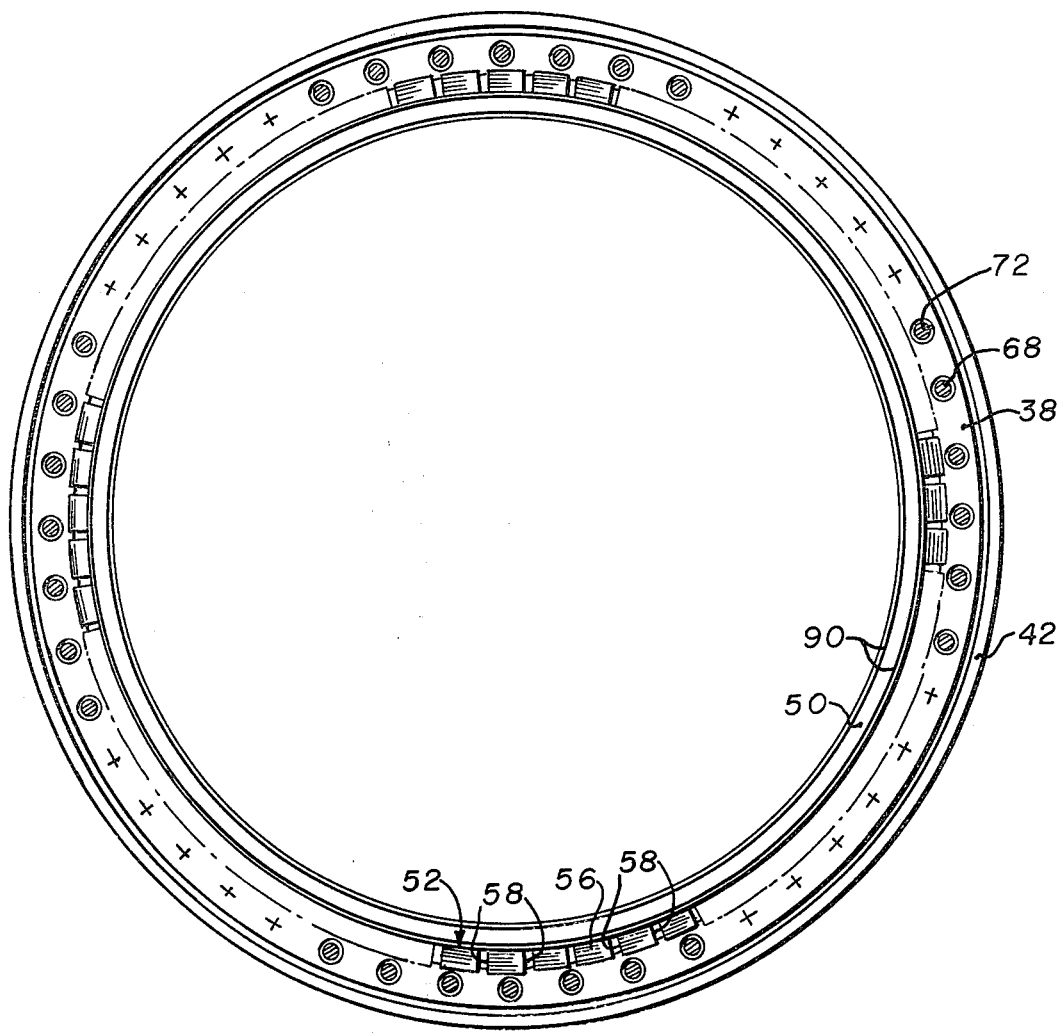
FIG. 3 is a plan view of the vessel head support arrangement with the vessel head and reactor vessel being deleted for clarity.

In the preferred embodiment, the vessel head 14 fits into the upper end of the reactor vessel 12 and is supported and sealed thereinplace. The vessel head support arrangement comprises an upper support ring 50, a plurality of flexible struts 52 and a spaced support ring 38, the spaced support ring 38 being the same ring which supports the vessel flexible arms 36. As noted hereinabove, the spaced support ring 38 is supported by the containment structure 16 in the vessel cavity 18 so as to be concentrically disposed with respect to and spaced from the reactor vessel 12. Referring to FIGS. 1, 2 and 3, the flexible struts 52 are arranged about the circumference of the reactor vessel 12 and have their lower ends bolted or otherwise fixedly connected to the lower spaced support ring 38. The uper ends of the flexible struts 52 are connected to and support the upper support ring 50 in concentric relationship with respect to the reactor vessel 12. The outer flanged end 54 of the vessel head 14 rests on and is totally and independently supported by the upper support ring 50. As best shown in FIG. 2, the flexible struts 52 are preferrably inclined from the lower support ring 38 toward the reactor vessel 12. However, this incline is not necessary for practice of the present invention and accordingly the flexible struts 52 may be vertical or even outwardly inclined if a larger vessel head flanged end 54 is provided.

As can best be seen in FIG. 3, each of the flexible struts 52 are flat plates which are arranged in facing relationship to the reactor vessel 12. That is, the surface 56 defined between the two side edges 58 of the plates 52 face the outer surface of the reactor vessel 12. As can be appreciated each of the plates 52 provides for a greater degree of flexibility out of the plane of the plates 52 as opposed to the degree flexibility in the plane of the plates 52. Accordingly, the support arrangement with the plates 52 arranged in facing relationship to the reactor provides radial flexibility and tangential stiffness and strength. In other words the support arms 52 permit free radial expansion and prohibit or limit lateral offset and rotational movement of the vessel head 14. Furthermore, the flexible strut support acts to centralize the supported head 14, insure a uniform distribution of load and insulate the lower spaced support ring 38 from the high temperature of the vessel head 14. This last feature is important since the concrete containment structure 16 must be kept at a moderately low temperature to insure its structual integrity.

Another important aspect of the head support arrangement is the provision for sealing to insure that liquid sodium does not come into contact with any oxygen, a necessary requirement as noted hereinabove. The reactor vessel cavity 18 is inerted so as to be free of oxygen and sealing means 60 are provided for preventing any fluid communication between the vessel cavity 18 and the atmosphere external thereto. As can best be seen in FIG. 2, sealing means 60 comprises a welded omega seal 62 for absorbing the axial and/or radial differential thermal expansion between the vessel head 14 and the containment structure 16. The omega seal 62 is continuously welded about the circumference of the cavity 18 opening between the outer skirt 64 of the vessel head 14 and the steel lining 66 of the containment structure 16. As is typical for liquid sodium fast spectrum reactors, a plurality of energy absorbing stretch bolts 68 are provided which will retain the vessel head 14 and prevent the destruction of the omega seal 62 to meet the requirements of a hypothetical accident. As best seen in FIGS. 2 and 3, the stretch bolts 68 are disposed about the circumference of the vessel 14 and pass through openings 70 and 72 in the flanged end 54 of the head 14 and the lower space support ring 38 and through the tubular extentions 80 extending upward from the upper surface of the vessel head 14. Nuts 76 are only loosely threaded to the ends of the bolts 68 so as to allow the bolts 68 to plastically deform and not break should the head 14 be forced upward. Seal covers 78 for each of the bolts 68 are welded to the tubular extensions 80 to prevent leakage out of the vessel cavity 18. The space between the outer skirt 64 and the inner skirt 66 above the vessel head 14 is filled with graphite shielding 74 to provide additional biological shielding.

It is also desirable to prevent any radioactive leakage into the vessel cavity 18 which would otherwise contaminte the cavity. Accordingly sealing means 82 are provided to prevent leakage between the vessel cavity 18 and the interior of the reactor vessel 12. This sealing means 82 also acts as back-up to the omega seal 62 between the vessel cavity 18 and the outside atmosphere to prevent a sodium-oxygen reaction. In the embodiment shown in FIG. 2, sealing means 82 comprises a welded omega seal 84 between upper support ring 50 and the reactor vessel 12, and a gasket type seal 86 between the vessel head 14 and the upper support ring 50. The welded omega seal 84 is continuously welded about the circumference of the vessel 12 to the lower surface of the upper support ring 50 and the flanged upper end 88 of the vessel 12 to allow for both axial differential thermal expansion between the vessel head 14 and the reactor vessel 12, and radial differential thermal expansion between the upper support ring 50 and the reactor vessel 12. The gasket type seal 86 is a static seal (i.e., non-moving) and consists of two soft metal concentric O-rings 90 disposed between the contact surface between the upper support ring 50 and the vessel head 14. The O-rings 90 are initially deformed upon contact to create the seal. Purge and monitoring lines 92 may be provided to the annular space between the two O-rings 90 to insure further protection against any seal leakage and to monitor any leakage ocurring across the seal.

This capability of providing a completely static seal as opposed to a sliding seal is an important advantage over the prior art. As the temperature varies, the radial differential thermal expansion between the vessel head 14 and the reactor vessel 12 will vary. Since such variations are likely to occur often during the life of the reactor 10, sliding seals will be subjected to much wear. This in turn will lead to an imperfect seal. However, as can be appreciated such wear will not be experienced with a static seal.

Figure 4:
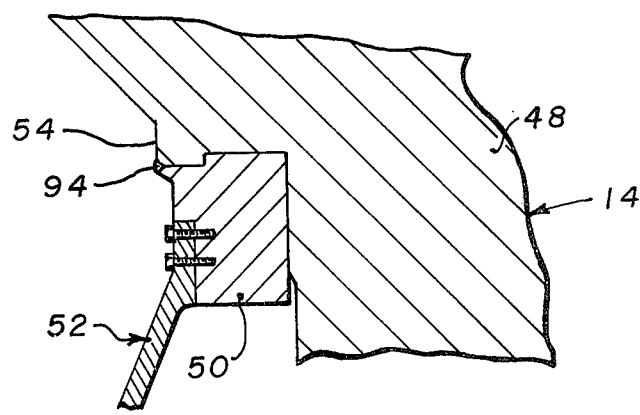
FIG. 4 is a side elevation view in section similar to a portion of FIG. 2 illustrating an alternative arrangement for sealing of the vessel head.

Furthermore, by having the capability of providing a static seal to prevent leakage between the vessel cavity 18 and the reactor vessel 12, different and perhaps more reliable seals can be used. For example, instead of using a gasket type seal and requiring monitoring lines to insure against seal leakage, a welded seal could be used. Such a seal 94 is shown in FIG. 4 in which the upper support ring 50 is welded to the vessel head 14. In this embodiment the flanged end 54 of the vessel head 14 has been modified to provide access to make the weld.

Accordingly, there is disclosed a novel vessel head support arrangement for a nuclear reactor. By supporting the head 14 on a ring 50 supported by a plurality of flexible struts 52, free radial differential thermal expansion can be accommodated while tangential or circumferential stiffness and strength is maintained. Furthermore, the circumferentially arranged flexible struts 52 act to centralize the vessel head 14 and to insure a uniform distribution of load. It should be noted that fabrication problems to obtain equal length arms and consentric, parallel rings may be simplified by final machining after assembly of the arms and rings. Further still, the head 14 (which is at a relatively high temperature) is insulated from the containment structure 16 (which must be maintained at a relatively low or moderate temperature). Finally, one of the most important features of the head support arrangement of the present invention is that it permits the use of a truely static seal to prevent fuel communication between the reactor vessel 12 and containment structuree or vessel cavity 18.

While these preferred embodiments of the invention have been shown and described, it will be understood that they are merely illustrative and changes may be made without departing from the scope of the invention as claimed.

What is claimed is:

1. A nuclear reactor head support arrangement comprising:
   a containment structure providing a vessel cavity;
   a reactor vessel vertically disposed and supported within said vessel cavity;
   a first support ring supported from said containment structure in said cavity, said first support ring being concentrically disposed with respect to and spaced from said vessel;
   a plurality of flexible struts spaced about said reactor vessel, said flexible struts each having one end connected to said first support ring;
   a second support ring concentrically disposed with respect to said reactor vessel, said second support ring being connected to the other ends of said flexible struts;
   a vessel head for said reactor vessel, said vessel head being aligned with said vessel and supported by said second support ring at the upper end of said vessel; and
   a first sealing means for preventing fluid communication between the interior of said reactor vessel and said cavity.

2. The head support arrangement of claim 1 wherein each of said flexible struts has a first degree of flexibility in the radial direction relative to said vessel and a second degree of flexibility in the circumferential direction relative to said vessel, said first degree of flexibility being greater than said second degree.

3. The support arrangement of claim 2 wherein each of said flexible struts is a plate disposed in facing relationship with respect to the external surface of said vessel.

4. The support arrangement of claim 3 wherein said reactor vessel is supported within said cavity by said first support ring.

5. The support arrangement of claim 1 wherein said first sealing means comprises a seal between said vessel and said second support ring and a seal between said second support ring and said vessel head.

6. The support arrangement of claim 5 further including a second sealing means between said vessel head and said containment structure for preventing fluid communication between said cavity and the atmosphere external to said cavity.

7. The support arrangement of claim 5 wherein said seal between said vessel and said second support ring is welded omega seal welded to said vessel and said second support ring about the circumference of said vessel, and said seal between said second support ring and said vessel head comprises at least one O-ring disposed between the contact surface between said second support ring and said vessel head.

8. The support arrangement of claim 5 wherein said seal between said vessel and said second support ring is welded omega seal welded to said vessel and said second support ring about the circumference of said vessel, and said seal between said second support ring and said vessel head comprises a weld between said vessel head and said second support ring about the circumference of said second support ring.

* * * * *